United States Patent [19]

Platt et al.

[11] Patent Number: 5,204,549

[45] Date of Patent: Apr. 20, 1993

[54] SYNAPTIC ELEMENT INCLUDING WEIGHT-STORAGE AND WEIGHT-ADJUSTMENT CIRCUIT

[75] Inventors: John C. Platt, Mountain View; Janeen D. W. Anderson, Fremont; Carver A. Mead, Pasadena, all of Calif.

[73] Assignee: Synaptics, Incorporated, San Jose, Calif.

[21] Appl. No.: 827,005

[22] Filed: Jan. 28, 1992

[51] Int. Cl.$^5$ .............................................. G06G 7/12
[52] U.S. Cl. .................................... 307/201; 307/529; 395/24
[58] Field of Search ............... 307/201, 529, 570, 450; 395/24

[56] References Cited

U.S. PATENT DOCUMENTS

| | | | |
|---|---|---|---|
| 4,660,166 | 4/1987 | Hopfield | 307/201 |
| 4,950,917 | 8/1990 | Holler et al. | 307/529 |
| 4,951,239 | 8/1990 | Andes et al. | 307/201 |
| 5,021,693 | 6/1991 | Shima | 307/201 |
| 5,055,897 | 10/1991 | Canepa et al. | 307/201 |
| 5,059,920 | 10/1991 | Anderson et al. | 395/24 |
| 5,063,601 | 11/1991 | Hayduk | 395/24 |
| 5,150,450 | 9/1992 | Swenson et al. | 395/24 |

Primary Examiner—David R. Hudspeth
Assistant Examiner—Jon Santamauro
Attorney, Agent, or Firm—Kenneth D'Alessandro

[57] ABSTRACT

A weight-storage and weight-adjustment circuit includes a first hot electron injection device coupled to a first floating gate and a second hot electron injection device coupled to the second floating gate. The floating gates are associated with two series connected MOS transistors. The first and second hot electron injection devices comprise gated lateral bipolar transistors. The weight may be decreased by injecting hot electrons from the first hot electron injection device onto the first floating gate to decrease the first analog voltage and increased by injecting electrons from the second hot electron injection device onto the second floating gate to decrease the second analog voltage. Circuitry are provided to periodically adjust the absolute voltage levels on the first and second floating gates to prevent them from becoming too negative over time. First and second electron tunneling devices are coupled to the first and second floating gates, respectively, to simultaneously adjust the voltages stored on the floating gates to keep them within a desired voltage range.

6 Claims, 4 Drawing Sheets

SYNAPTIC ELEMENT INCLUDING WEIGHT-STORAGE AND WEIGHT-ADJUSTMENT CIRCUIT

BACKGROUND OF THE INVENTION

1. Field Of The Invention

The present invention pertains to neural networks and to electronic circuits for performing the learning function. More particularly, the present invention pertains to circuits for adjusting a synaptic weight based on the product of an input signal and an error signal.

2. The Prior Art

Many schemes have been proposed to use floating gate structures as weight storage for analog neural networks. Any such network requires a synaptic update mechanism which allows the weight to be changed depending on the combination of an input signal and an error signal. The most popular update rules currently in use implement some form of gradient descent, in which the weight is decreased when the input is of the same sign as the error, and is increased when the input has a sign opposite to that of the error. This form of learning is thus inherently a four quadrant computation. The desirable properties of such an update mechanism when implemented in an analog integrated circuit are small size, and freedom from high-voltage circuitry requirements within the cell itself. The learning rate of such an update mechanism should not vary widely between circuits on the same chip.

Floating gates have been proposed as a long term storage mechanism for neural networks. Many proposed on-chip learning devices use electron tunneling as the mechanism for adjusting the weights stored on these floating gates. Tunneling presents two very difficult problems. First, tunneling across an oxide induces trapping of electrons in the oxide. These electrons create a field opposing the tunneling field. The effect of charge trapping is that the performance of a tunneling device degrades over time and in a non-uniform manner from tunneling device to tunneling device. Second, for an inter-poly tunneling device, the voltage-current characteristics can vary widely for identical devices across a single chip.

BRIEF DESCRIPTION OF THE INVENTION

According to a first aspect of the present invention, a weight storage and weight adjustment circuit is provided. This circuit is connected to a synapse. The weight is stored as the difference between two analog voltages held on two separate floating gates. The stored weight can be positive or negative, to generate an output based on some synaptic function. The synapse generates an output based on the product of the weight and an input signal, a very common synaptic function used in Back-propagation. The outputs from a plurality of synapses associated with a neuron are summed to form the neuron output. An error signal based on the neuron output is fed back to the weight adjustment circuits of the synapses associated with the neuron.

A weight-storage and weight-adjustment circuit according to the present invention is associated with a synapse including a first and a second MOS transistor connected in series between a positive output line and a negative output line. The positive and negative output lines are held at a reference voltage. The common source/drain connection between the two series connected MOS transistors forms an input node for the synapse. A first floating gate is associated with the first MOS transistor and a separate second floating gate is associated with the second MOS transistor. The first and second floating gates each form one plate of a weight storage capacitor. The other plate of each weight-storage capacitor is referenced to a fixed voltage potential. The weight is stored as the difference between the two analog voltages on the weight-storage capacitors associated with the first and second floating gates.

The weight-storage and weight-update circuit of the present invention includes a first hot electron injection device coupled to the first floating gate and a second hot electron injection device coupled to the second floating gate. The first and second hot electron injection devices comprise gated lateral or vertical bipolar transistors.

The weight may be decreased by injecting hot electrons from the first hot electron injection device onto the first floating gate to decrease the first analog voltage and increased by injecting electrons from the second hot electron injection device onto the second floating gate to decrease the second analog voltage.

Means are provided to periodically adjust the absolute voltage levels on the first and second floating gates to prevent them from becoming too negative over time. First and second electron tunneling devices are coupled to the first and second floating gates, respectively, to simultaneously adjust the voltages stored in the first and second storage capacitors to keep them within a desired voltage range.

According to a second aspect of the present invention, a plurality of synaptic elements each provided with a synaptic weight storage and weight adjustment circuit. Signal and weight inputs and outputs are distributed to the individual synaptic elements and weight storage and weight adjustment circuits by a plurality of row and column lines spanning the array. Driver circuits for the various signals may be placed on the periphery of the array as is known in the art.

BRIEF DESCRIPTION OF THE DRAWINGS

FIG. 2 is a schematic diagram of an exemplary update-pulse generator for use with the weight-storage and weight-adjustment circuit of FIG. 1a.

FIG. 3 is a schematic diagram of an exemplary error-pulse generator for use with the weight-storage and weight-adjustment circuit of FIG. 1a.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The weight-storage weight-adjustment circuit of the present invention may be used with a synapse comprising two MOS transistors connected in series between a positive output line and a negative output line. The structure and operation of this synapse is generally described in Denyer and Mavor, *A MOST Transconductance Multiplier for Array Applications*, IEE Proceedings, Vol. 128, part 1, No. 3, June 1981, pp. 81-86. A plurality of such synapses, along with a plurality of weight-storage and weight-update circuits according to the present invention may be integrated onto a single piece of semiconductor substrate material.

Figure 1A:
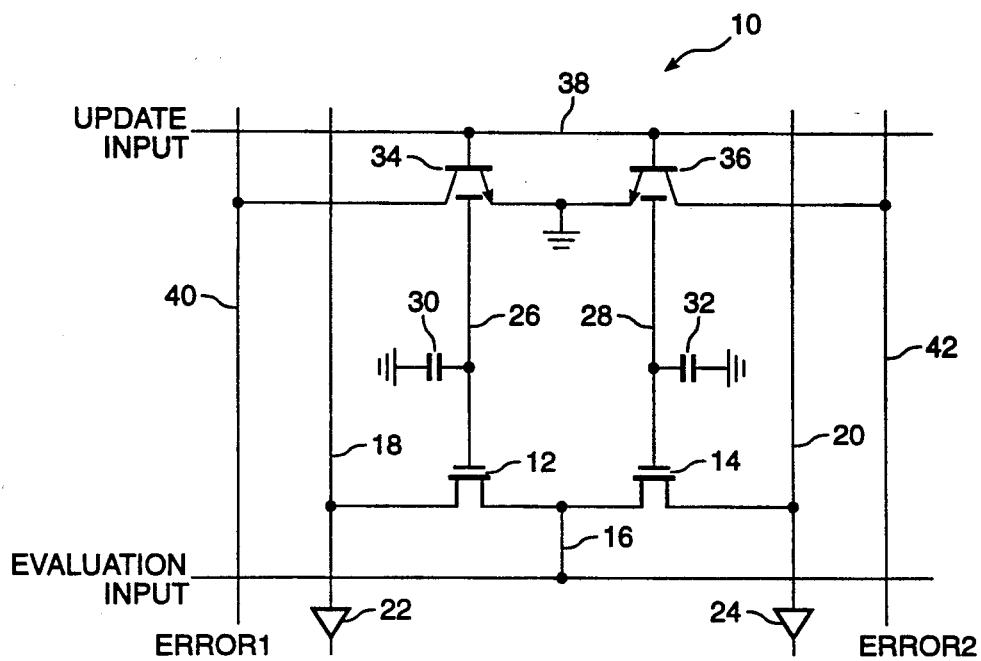
FIG. 1a is a schematic diagram of a presently preferred embodiment of a synapse incorporating a weight-storage and weight-adjustment circuit according to a presently preferred embodiment of the present invention.

Referring first to FIG. 1a, a schematic diagram illustrates a weight-storage weight-adjustment circuit according to a presently preferred embodiment of the invention connected to a synapse 10 comprising a first N-channel MOS transistor 12 and a second N-channel MOS transistor 14 connected in series. The common source/drain connection between MOS transistors 12 and 14 form a voltage input ($V_{in}$) signal node 16 for the synapse 10. In a presently preferred embodiment of the invention, the input voltage $V_{in}$ at this node may vary from between about 1.5 to 2.5 volts.

Transistors 12 and 14 are connected in series between a positive output line 18 and a negative output line 20. Positive output line 18 and negative output line 20 are connected to the inputs of positive and negative current-sense amplifiers 22 and 24 respectively, and are thus biased to a reference voltage $V_{ref}$ of about 2.0 volts by their respective current-sense amplifiers. The input voltage $V_{in}$ may therefore be positive or negative with respect to the reference voltage $V_{ref}$.

A first floating gate 26 forms the gate of first MOS transistor 12 and a second separate floating gate 28 forms the gate of second MOS transistor 14. First floating gate 26 has a capacitance, shown as capacitor 30, associated with it. Similarly, second floating gate 28 has a capacitance, shown as capacitor 32, associated with it. These capacitances may be the inherent floating gate capacitances, or may be enhanced by provision of additional capacitor structure as is well known in the art. Typically, capacitors 30 and 32 will be matched in capacitance value.

Capacitor 30 stores a first analog voltage $V_1$ and capacitor 32 stores a second analog voltage $V_2$. The difference between $V_1$ and $V_2$ acts as a weight term w for synapse 10. The voltages V1 and V2 may be deliberately altered by injection of hot electrons onto the first and second floating gates 26 and 28. Hot-electron injection device 34 is connected to first floating gate 26 and hot-electron injection device 36 is connected to second floating gate 28. Hot-electron injection devices 34 and 36 may be gated lateral or vertical bipolar transistors, the structure and operation of which are described in detail in U.S. Pat. No. 4,539,928, issued Sep. 4, 1990, and 5,059,920, issued Oct. 22, 1991. expressly incorporated herein by reference. Those of ordinary skill in the art will recognize that because either voltage $V_1$ or $V_2$ may be greater than the other, the weight term may be positive or negative.

The synapse and weight-storage weight-update circuit of the present invention has two operational modes. The first mode is an evaluation mode where the result of I*w for all of the neurons is calculated. The second mode is an update mode where the weights are increased or decreased.

In the evaluation mode, the difference in the currents on the positive output line 18 and the negative output line 20 is the result of the function $V_{in}$*w. For a neuron with more than one synapse 10, the positive output line 18 and the negative output line 20 are shared among the synapses and the inputs to current-sense amplifiers 22 and 24 perform the summing function for the individual currents provided by the individual synapses. The difference in currents on these lines would be the result of the inner product I*w, where the component $i_n$ of I is the difference between $V_{in}$ and $V_{ref}$ for synapse n, and component $w_n$ of w is the difference between $V_1$ and $V_2$ stored on first and second floating gates 26 and 28 for synapse n.

Figure 1B:
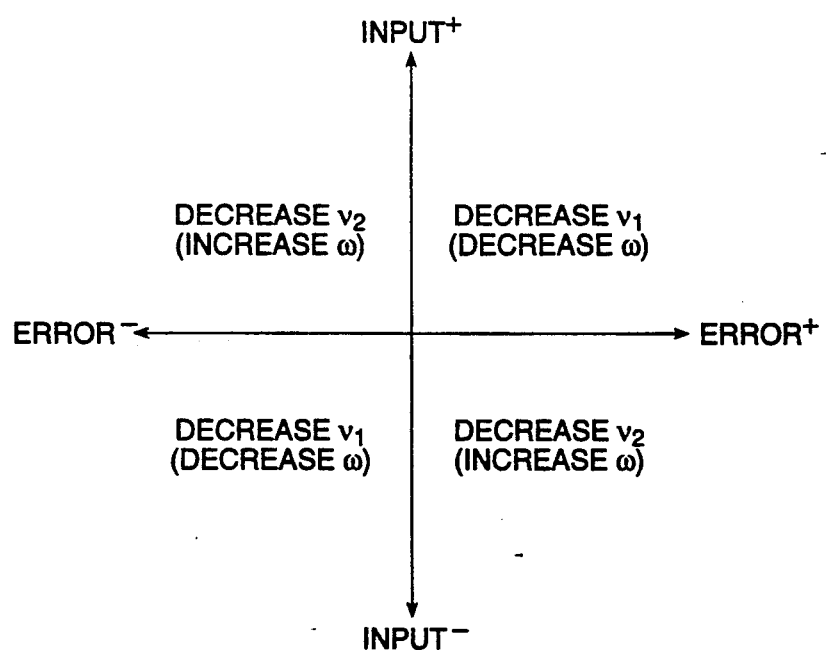
FIG. 1b is a four quadrant representation of the increase or decrease in weight as a function of input and error polarities.

Since both input and error signal can be either positive or negative the weight-update process performed by the circuit of the present invention must be a four-quadrant multiplication. When the error and input are of the same sign, the weight should be decreased. When the error and input are of opposing signs, the weight should be increased. The magnitude of the change in weight should be a function of the magnitude of the error signal and the magnitude of the input signal. This is shown symbolically in FIG. 1b.

During the update mode, an error signal is fed back to all of the synapses in a neuron. The error signal can be computed via the Widrow-Hoff rule or via back propagation. If the network is a one-layer network with linear neurons, then the error is the difference between the neuron output (I*w) and a desired output.

If the error is negative, it is necessary to increase the weight of all of the synapses with positive inputs and decrease the weight of synapses with negative inputs. Conversely if the error is positive, it is necessary to decrease the weight of all of the synapses with positive inputs and increase the weight of synapses with negative inputs.

Thus, in the case where the error is negative, $V_1$ should be decreased by injecting electrons onto first floating gate 26 using the first hot-electron injection device 34 for all synapses with a negative input. $V_2$ should be decreased by injecting electrons onto second floating gate 28 using the second hot-electron injection device 36 for all synapses with a positive input. In the case where the error is positive, $V_2$ should be decreased by injecting electrons onto second floating gate 28 using the second hot-electron injection device 36 for all synapses with a negative input. $V_1$ should be decreased by injecting electrons onto first floating gate 26 using the first hot-electron injection device 34 for all synapses with a positive input. The amount of decrease for $V_1$ or $V_2$ should be a function of the magnitude of the input and the magnitude of the error.

For the hot-electron injection device disclosed in U.S. Pat. No. 4,953,928, the rate of injection is a linear function of base current. Those of ordinary skill in the art will appreciate that base current is an exponential function of base voltage, and hence the rate of injection is also an exponential function of collector voltage over approximately a 3.5 volts range above the base voltage.

As depicted in FIG. 1a, both hot electron injection devices 34 and 36 have their bases connected to an update enable input line 38 and have their emitters grounded. The collector of the first hot-electron injection device 34 is connected to a first error line 40, and the collector of the second hot-electron injection device 36 is connected to a second error line 42.

According to the present invention, circuitry is provided to enable one of hot-electron injection devices 34 or 36 to inject electrons onto one of floating gates 26 or 28 to lower the appropriate one of voltages $V_1$ or $V_2$. Examples of such circuitry are disclosed in FIGS. 2 and 3.

Figure 2:
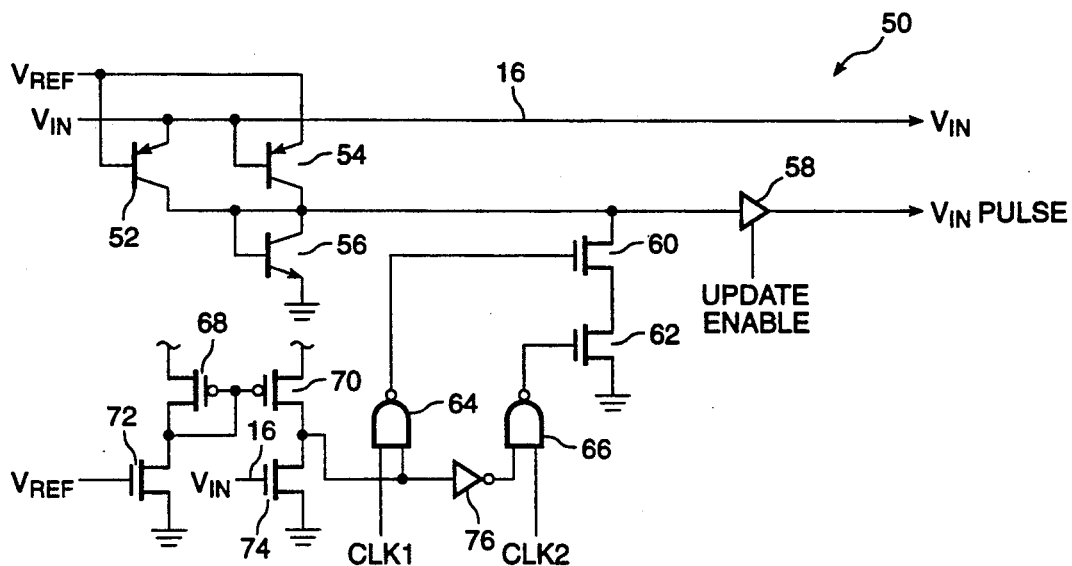

Referring first to FIG. 2, an update-pulse generator circuit 50 suitable for use with the weight-storage and weight-adjustment circuit of FIG. 1a is shown. The update-pulse generator circuit 50 represents the magnitude of the input as a function of the height (voltage magnitude) of a pulse having a fixed width. Those of ordinary skill in the art will recognize that the input magnitude could also be represented by pulse width.

A presently preferred embodiment comprises a rectifying circuit, a comparator, gating logic, and a buffer. Input pulse generator circuit 50 is a row-wide circuit for all synapses in a single row of a synaptic array, and includes first and second bipolar PNP transistors 52 and 54. Bipolar PNP transistor 52 has its emitter connected to $V_{in}$, and the emitter of bipolar PNP transistor 54 is connected to $V_{ref}$, a source of reference voltage. The base of bipolar PNP transistor 52 is connected to $V_{ref}$ and the base of bipolar PNP transistor 54 is connected to the $V_{in}$ signal node 16. Diode-connected bipolar NPN transistor 56 has its collector and base connected to the collectors of bipolar PNP transistors 52 and 54 and its emitter connected to as fixed voltage such as ground. The collectors of bipolar PNP transistors 52 and 54, and $V_{ref}$ are connected together to the input of gated buffer amplifier 58. Gated buffer amplifier 58 may be a follower-connected transconductance amplifier whose bias is gated by the update enable clock signal, suitably sized such that, when the update clock is high, the buffer holds the $V_{in}$ pulse line to whatever voltage is presented to the buffer's input node with sufficient drive for the load required by the synapses of the row. When the update clock signal is low, the buffer will not drive the $V_{in}$ pulse line. Together, bipolar transistors 52, 54, and 56 act as a rectifier which places the approximate value $|V_{in}-V_{ref}|$ on the input of buffer amplifier 58.

Two N-channel MOS transistors 60 and 62 are connected in series between the input to buffer amplifier 58 and a fixed voltage, such as ground. The gate of MOS transistor 60 is driven from the output of negative gate 64 and the gate of MOS transistor 62 is driven from the output of positive gate 66. MOS transistors 60 and 62 are normally on, thus pulling the input of buffer 58 to ground.

The function of negative gate 64 is to pass a $V_{in}$ pulse derived from the signal CLK1 and the function of positive gate 66 is to pass a positive $V_{in}$ pulse derived from the signal CLK2. Negative and positive gates 64 and 66 are driven by the output of a conventional comparator comprising MOS transistors 68, 70, 72, and 74, which compares $V_{in}$ with $V_{ref}$, and inverter 76. If $V_{in} > V_{ref}$, the positive-going clock pulse CLK2 is passed through positive gate 66, turning off MOS transistor 62, and thus releasing the input of buffer 58 to follow the approximate value $|V_{in}-V_{ref}|$ during the period of the positive input clock pulse. If $V_{in} < V_{ref}$, a positive-going clock pulse CLK1 is passed through negative gate 64, turning off MOS transistor 60, and thus releasing the input of buffer 58 to follow the approximate value $|V_{in}-V_{ref}|$ during the period of the negative input clock pulse.

Buffer amplifier 58 is gated by an update enable signal. Its output is connected to $V_{in}$ pulse line 38 of the circuit of FIG. 1a. When the update signal is asserted, the output of buffer amplifier, synchronous with either CLK1 or CLK2 pulse, is asserted on update-enable input line 38 is a voltage proportional to approximately $|V_{in}-V_{ref}|$.

Figure 3:
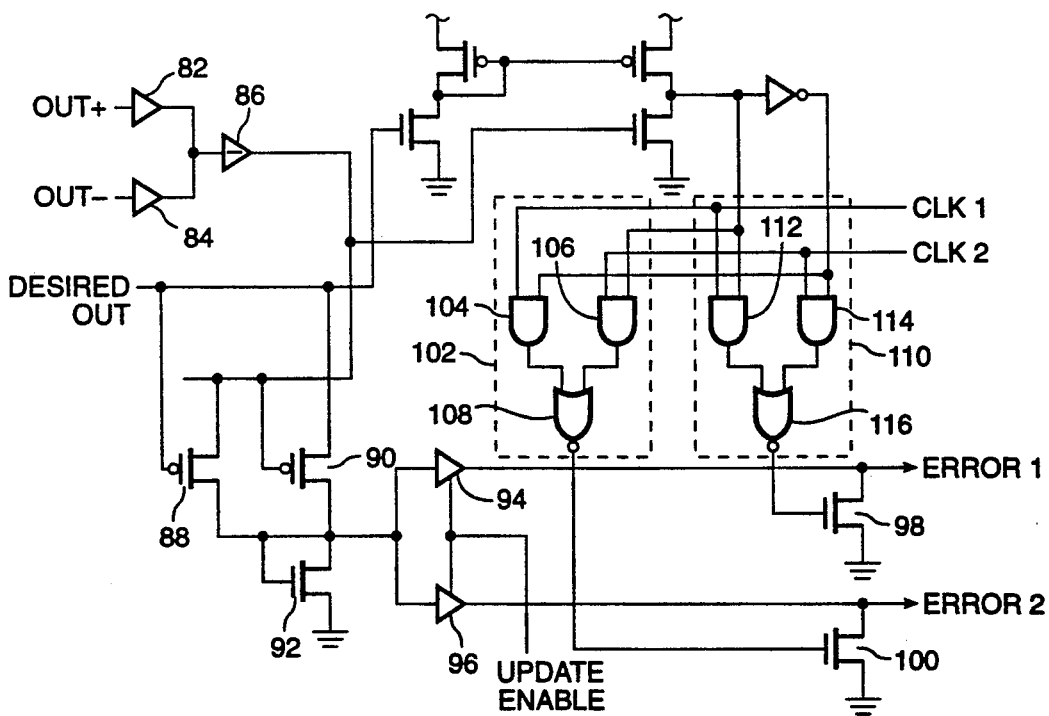

Referring now to FIG. 3, presently preferred error-pulse-generator circuitry 80 suitable for generating the error pulses for use by the circuit of FIG. 1a is shown. Error-pulse generator circuitry 80 is column-wide circuitry in a one-layer synaptic array. Sense amplifiers 82 and 84 convert the current output signals on positive output line 18 and negative output line 20 to voltages. The difference between these voltages is determined by subtractor circuit 86, which produces a composite neuron output voltage signal $V_{no}$. As those of ordinary skill in the art will appreciate, there are several well-known ways to implement the sense amplifiers and subtraction circuit shown in FIG. 3.

A rectifier circuit comprising MOS transistors 88, 90, and 92 connected to the neuron output signal and a voltage $V_{do}$ representing the desired output places a voltage having a magnitude approximately equal to $|V_{no}-V_{do}|$ at the input of gated buffer amplifiers 94 and 96. Buffered amplifiers 94 and 96 are gated by the Update Enable signal such that when the update enable signal is high buffer amplifier 94 drives the Error1 line 40 and buffer amplifier 96 drives the Error2 line 42 of FIG. 1a to the voltage presented on the input nodes of those amplifiers. Both signals are voltages with a magnitude equal to approximately $|V_{no}-V_{do}|$. Both amplifiers 94 and 96 should be designed such that they can sufficiently drive the load required by the synapses of the column. When the Update Enable signal is low, the buffers do not drive the Error1 and Error2 lines.

MOS transistor 98 is connected between first error line 40 and a fixed voltage such as ground. MOS transistor 100 is connected between second error line 42 and a fixed voltage such as ground. MOS transistor 100 is driven by a gating circuit 102 comprising AND gates 104 and 106 driving NOR gate 108. MOS transistor 98 is driven by a gating circuit 110 comprising AND gates 112 and 114 driving NOR gate 116. MOS transistors 98 and 100 are normally on, thus holding the first and second error lines 40 and 42 at ground. They are turned on by coincidence of CLK1 and CLK2 signals with the negative and positive output signals from the comparator.

Figure 4A:
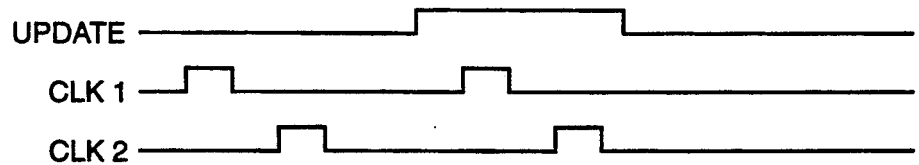
FIGS. 4a and 4b are timing diagrams showing the timing relationships between the clock signals, update pulses, and the error pulses generated by the circuitry of FIGS. 2 and 3.
Figure 4B:
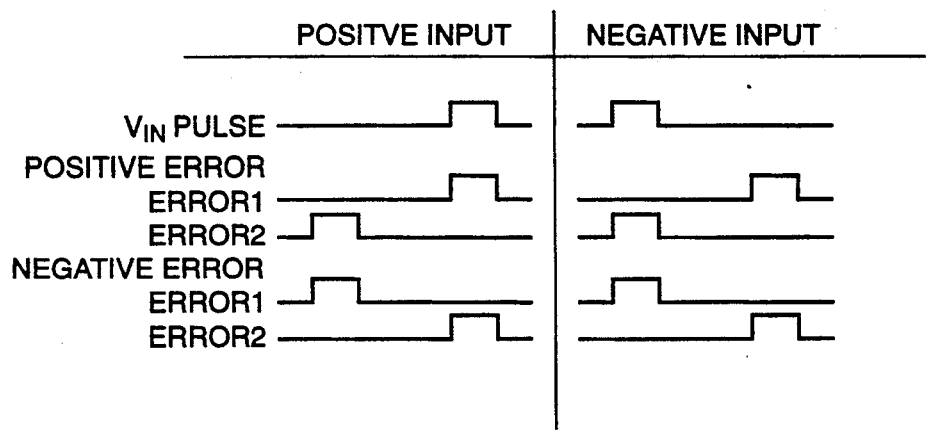

Referring now to FIGS. 4a and 4b, illustrative timing relationships between the various clock and other control signals used in the circuits of FIGS. 2 and 3 are shown. The relationships between the CLK1, CLK2, and Update Enable signals are shown in FIG. 4a. FIG. 4b shows the relationships between the update enable signal on line 38, and the signals on first error line and second error line for both positive and negative inputs and errors During the update mode, the circuits of FIGS. 2 and 3 raise $V_{in}$ pulse line 38 to a voltage level between zero and 0.75 volts, communicating the magnitude of the input. Simultaneously, either the first or second error lines 40 or 42 is raised to a level between zero and 4.25 volts, communicating the magnitude of the error. The analog voltage $V_1$ or $V_2$, but not both, will be decreased proportional to the product of the exponential of the $V_{in}$ pulse line voltage and the error voltage. This is achieved using the pulsing scheme illustrated in the timing diagram of FIGS. 4a and 4b. The height of the pulses carries the magnitude of the input and the error, and the simultaneity of the input pulse with either the error1 or error2 pulses is determined by the sign of the input for a given synapse and the sign of the error for the neuron.

It is desirable to operate the hot-electron injection devices 34 and 36 of the weight-storage and weight-update circuit of the present invention in a range where the electron injection rate is not overly dependent upon the voltage on first and second floating gates 26 and 28. This regime of operation sets a lower bound on the range of $V_1$ and $V_2$ to about 5.5 volts above the base of the hot-electron injection devices. As the values of $V_1$ and $V_2$ are driven progressively more negative by repeated updates, it becomes necessary to adjust $V_1$ and $V_2$ by simultaneously making them more positive without changing the difference between them (i.e., without disturbing the weight).

Figure 5:
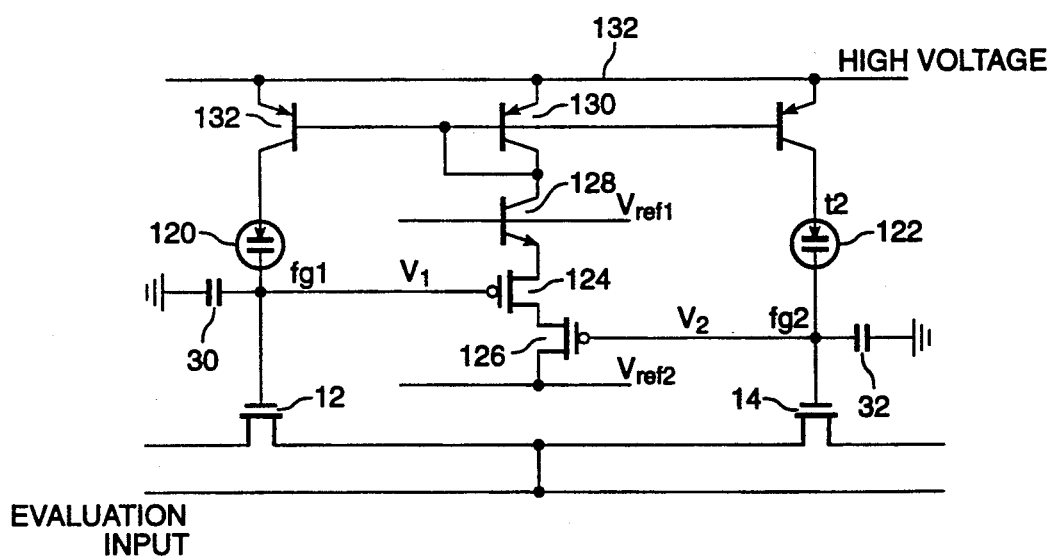
FIG. 5 is a schematic diagram of a circuit for controlling two tunneling devices connected to two different floating gates to simultaneously change the voltages on the two floating gates by the same amount.

Referring now to FIG. 5, additional circuitry for performing this function is disclosed. A first tunneling device 120 is connected to first floating gate 26, and a second tunneling device 122 is connected to second floating gate 28. Floating gate 26 is also the gate of a first P-channel MOS transistor 124 and floating gate 28 is also the gate of a second P-channel MOS transistor, 126.

The source of MOS transistor 124 is connected to the emitter of an NPN transistor 128 having its base connected to a reference voltage $V_{ref1}$ and its collector connected to collector and base of a diode-connected PNP transistor 130. PNP transistor 130 is the master transistor of two current mirrors. The emitter of PNP transistor 130 is connected to a high voltage line 132, held at a voltage of about 20 volts. The drain of MOS transistor 124 is connected to the source of MOS transistor 126. The drain of MOS transistor 126 is connected to a source of reference voltage $V_{ref2}$. The current flowing through master transistor 130 is set by the two-series P-channel MOS transistors 124 and 126. The current flowing through these series P-channel MOS transistors is a function primarily of the difference between $V_{ref1}$ and the larger of the two floating gate voltages $V_1$ and $V_2$. Thus $V_{ref1}$ sets an upper limit to the range of the floating gate voltages $V_1$ and $V_2$. Vref2 is a low voltage source.

PNP transistor 134, having its emitter connected to high voltage line 132, its base connected to the base and collector of diode-connected PNP transistor 130, and its collector connected to the anode of first tunneling device 120, is the slave transistor of the first current mirror. It sets the current flowing into first tunneling device 120 coupled to first floating gate 26. The voltage $V_{t1}$ at the anode of the first tunneling device 120 rises to whatever voltage the device requires to sink a tunneling current equal to the current sourced by the slave transistor 134.

PNP transistor 136, having its emitter connected to high voltage line 132, its base connected to the base and collector of diode-connected PNP transistor 130, and its collector connected to the anode of second tunneling device 122, is the slave transistor of the second current mirror. It sets the current flowing into second tunneling device 122 coupled to second floating gate 28. The voltage $V_{t2}$ at the anode of the second tunneling device 122 rises to whatever voltage the device requires to sink a tunneling current equal to the current sourced by the slave transistor 136. Since the two current mirrors are driven from the same master transistor 130, they draw nearly identical current. Thus the currents through the first and second tunneling devices 120 and 122 are closely matched even though their required tunneling voltages $V_{t1}$ and $V_{t2}$ may differ drastically.

This device will adjust a differential synaptic weight based on the product of an input signal and an error signal. This is a basic operation fundamental to a variety of well-known neural-network learning algorithms, some examples are Hebbian Learning, principle-component analysis, error-back propagation, and Widrow-Hoff LMS rule (an algorithm used in adaptive filters).

Figure 6:
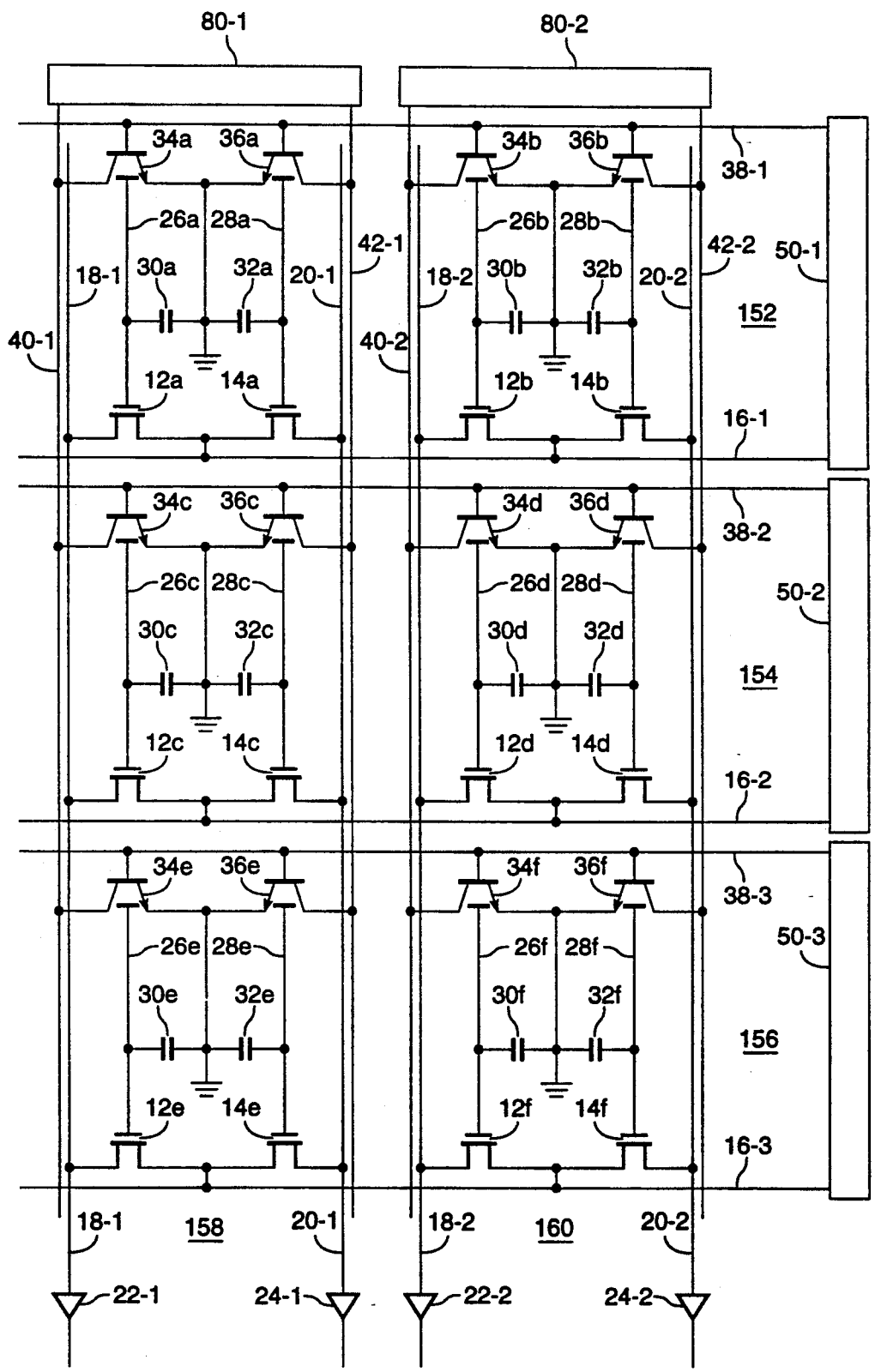
FIG. 6 is a schematic diagram of an array of synaptic elements including weight storage and weight adjustment circuits.

A primary application of a synaptic element provided with a weight storage and weight adjustment circuit of the type disclosed herein is as a part of a synaptic array including a plurality of such elements. Referring now to FIG. 6, a schematic diagram of an illustrative example of such an array is presented. The array of FIG. 6 includes six synaptic elements arranged in a matrix of three rows and two columns. Those of ordinary skill in the art will recognize that the array of FIG. 6 is illustrative only and that arrays of arbitrary size may be configured to suit specific applications, limited as a practical matter only by integration-density and chip-size limitations.

As can be seen from FIG. 6, array 150 includes first row 152 including synaptic elements 10a and 10b, second row 154 including synaptic elements 10c and 10d, and third row 156 including synaptic elements 10e and 10f. Similarly, first column 158 includes synaptic elements 10a, 10c, and 10e, and second column 160 includes synaptic elements 10b, 10d, and 10f. Synaptic elements 10a-10f may be the same synaptic elements depicted in FIG. 1a, and the same reference numerals used for the elements of synaptic element 10 of FIG. 1a are used in FIG. 6, followed by lower-case letter subscripts to identify the particular synaptic element in array 150.

Signal input line 16-1 is associated with synaptic elements 10a and 10b of first row 152 of array 150. In like fashion, signal input lines 16-2, and 16-3 are associated with synaptic elements 10c and 10d of second row 154, and synaptic elements 10e and 10f of third row 156 of array 150, respectively.

Update input line 38-1 is associated with synaptic elements 10a and 10b of first row 152 of array 150. In like fashion, update input lines 38-2, and 38-3 are associated with synaptic elements 10c and 10d of second row 154, and synaptic elements 10e and 10f of third row 156 of array 150, respectively.

Positive output line 18-1 is associated with synaptic elements 10a, 10c, and 10e of first column 158 of array 150. In like fashion, positive output line 18-2 is associated with synaptic elements 10b, 10d, and 10f of second column 160 of array 150. Negative output line 20-1 is associated with synaptic elements 10a, 10c, and 10e of first column 158 of array 150. In like fashion, Negative output line 20-2 is associated with synaptic elements 10b, 10d, and 10f of second column 160 of array 150. Positive output line 18-1 drives sense amplifier 22-1 common to all synapses in the first column and negative output line 20-1 drives sense amplifier 24-1 common to all synapses in the first column. Positive output line 18-2 drives sense amplifier 22-2 common to all synapses in the second column and negative output line 20-2 drives sense amplifier 24-2 common to all synapses in the second column.

Finally, Error$_1$ line 40-1 is associated with synaptic elements 10a, 10c, and 10e of first column 158 of array 150, and Error$_1$ line 40-2 is associated with synaptic elements 10b, 10d, and 10f of second column 160 of array 150. Error$_2$ line 42-1 is associated with synaptic elements 10a, 10c, and 10e of first column 158 of array 150, and Error$_2$ line 42-2 is associated with synaptic elements 10b, 10d, and 10f of second column 160 of array 150.

Update-pulse-generator circuit 50-1 is used to drive signal input and error input lines 16-1 and 38-1 and update-pulse generator circuit 50-2 is used to drive signal input and error input lines 16-2 and 38-2. Update-pulse-generator circuits 50-1 and 50-2 may be circuits such as those depicted in FIG. 2.

Error-pulse-generator circuit 80-1 is used to drive Error$_1$ and Error$_2$ lines 40-1 and 42-1 and error-pulse-generator circuit 80-2 is used to drive Error$_1$ and Error$_2$ lines 40-2 and 42-2. Error-pulse-generator circuits 80-1 and 80-2 may be circuits such as those depicted in FIG. 3.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A synaptic element including a weight-storage and weight-adjustment circuit, comprising:
   an input node;
   a positive output node;
   a negative output node;
   a first floating node;
   a second floating node;
   a first MOS transistor, having a source connected to said positive output node, a drain connected to said input node, and a gate comprising at least a portion of said first floating node;
   a second MOS transistor having a source connected to said input node, a drain connected to said negative output node, and a gate comprising at least a portion of said second floating node;
   first means for injecting electrons onto said first floating node;
   second means for injecting electrons onto to said second floating node;
   third means for simultaneously removing essentially the same number of electrons from said first and second floating nodes to maintain them within a desired voltage range;
   means for comparing an output signal at said output node with a desired output signal and for generating a positive error signal if said output signal is more positive than said desired output signal and for generating a negative error signal if said output signal is more negative than said desired output signal;
   means for generating a positive-input-present-signal if a positive input signal is present at said input node and for generating a negative-input-signal-present if a negative signal is present at said input node;
   means for defining a weight-update interval;
   means responsive to the simultaneous presence of said positive error signal and said positive-input-present-signal and active during said weight-update interval, for activating said first means for injecting electrons onto said first floating node at a rate proportional to the product of said positive error signal and said positive-input-present-signal;
   means responsive to the simultaneous presence of said positive error signal and said negative-input-present-signal and active during said weight-update interval, for activating said second means for injecting electrons onto said second floating node at a rate proportional to the product of said positive error signal and said negative-input-present-signal;
   means responsive to the simultaneous presence of said negative error signal and said positive-input-present-signal and active during said weight-update interval, for activating said second means for injecting electrons onto said second floating node at a rate proportional to the product of said negative error signal and said positive-input-present-signal;
   means responsive to the simultaneous presence of said negative error signal and said negative-input-present-signal and active during said weight-update interval, for activating said first means for injecting electrons onto said first floating node at a rate proportional to the product of said negative error signal and said negative-input-present-signal.

2. The synaptic element of claim 1 wherein said first and second means are non-avalanche hot electron injection devices and wherein said third means comprises tunneling devices.

3. In a synaptic array, a synaptic element including a weight-storage and weight-adjustment circuit, comprising:
   an input node;
   a positive output node;
   a negative output node;
   a first floating node, at least a portion of which comprises the gate of at least a first MOS transistor of said synaptic element;
   a second floating node, at least a portion of which comprises the gate of at least a second MOS transistor of said synaptic element;
   first means for injecting electrons onto said first floating node;
   second means for injecting electrons onto to said second floating node;
   third means for simultaneously removing essentially the same number of electrons from said first and second floating nodes to maintain them within a desired voltage range;
   means for comparing an output signal at a selected node in said array with a desired output signal and for generating a positive error signal if said output signal is more positive than said desired output signal and for generating a negative error signal if said output signal is more negative than said desired output signal;
   means for generating a positive-input-present-signal if a positive input signal is present at said input node and for generating a negative-input-signal-present if a negative signal is present at said input node;
   means for defining a weight-update interval;
   means responsive to the simultaneous presence of said positive error signal and said positive-input-present-signal and active during said weight-update interval, for activating said first means for injecting electrons onto said first floating node at a rate proportional to the product of said positive error signal and said positive-input-present-signal;

means responsive to the simultaneous presence of said positive error signal and said negative-input-present-signal and active during said weight-update interval, for activating said second means for injecting electrons onto said second floating node at a rate proportional to the product of said positive error signal and said negative-input-present-signal;

means responsive to the simultaneous presence of said negative error signal and said positive-input-present-signal and active during said weight-update interval, for activating said second means for injecting electrons onto said second floating node at a rate proportional to the product of said negative error signal and said positive-input-present-signal;

means responsive to the simultaneous presence of said negative error signal and said negative input-present-signal and active during said weight-update interval, for activating said first means for injecting electrons onto said first floating node at a rate proportional to the product of said negative error signal and said negative-input-present-signal.

4. The synaptic element of claim 3 wherein said first and second means are non-avalanche hot electron injection devices and wherein said third means comprises tunneling devices.

5. A synaptic array including:

a plurality of synaptic elements arranged in at least one row and at least one column, each of said first synaptic elements including an input node, a positive output node, a negative output node, a first floating node, a second floating node, a first MOS transistor having a source connected to said positive output node, a drain connected to said input node, and a gate comprising at least a portion of said second first floating node, a second MOS transistor having a source connected to said input node, a drain connected to said negative output node, and a gate comprising at least a portion of said second floating node, a first hot-electron injector for injecting electrons onto said first floating node, said first hot-electron injector comprising a gated bipolar transistor having a gate electrically connected to said floating node, an emitter connected to a fixed voltage source, a base, and a collector, a second hot-electron injector for injecting electrons onto said second floating node, said second hot-electron injector comprising a gated bipolar transistor having an emitter connected to a fixed voltage source, a gate electrically connected to said floating node, a base, and a collector, and means for simultaneously removing essentially the same number of electrons from said first and second floating nodes to maintain them within a desired voltage range;

a plurality of signal input lines, a unique one of said signal input lines associated with each of said rows, each unique one of said signal input lines connected to the input nodes of each of said synaptic elements associated with its row;

a plurality of positive output lines, a unique one of said positive output lines associated with each of said columns, each unique one of said positive output lines connected to the positive output nodes of each of said synaptic elements associated with its column;

a plurality of negative output lines, a unique one of said negative output lines associated with each of said columns, each unique one of said negative output lines connected to the negative output nodes of each of said synaptic elements associated with its column;

a plurality of positive current sense amplifiers, a unique one of said positive current sense amplifiers driven by one of said positive output lines;

a plurality of negative current sense amplifiers, a unique one of said negative current sense amplifiers driven by one of said negative output lines;

a plurality of first error lines, a unique one of said first error lines associated with each of said columns, each unique one of said first error lines connected to the collector of the first hot-electron injector of each of said synaptic elements associated with its column;

a plurality of second error lines, a unique one of said second error lines associated with each of said columns, each unique one of said second error lines connected to the collector of the second hot-electron injector of each of said synaptic elements associated with its column;

a plurality of update input lines, a unique one of said update input lines associated with each of said rows, each unique one of said update input lines connected to the bases of said first and second hot-electron injectors of each of said synaptic elements associated with its row;

means for individually summing the outputs of said positive and negative current sense amplifiers associated with each of said columns to produce a column output signal;

means for comparing each column output signal with a desired output signal and for generating a positive error signal if said column output signal is more positive than said desired output signal and for generating a negative error signal if said column output signal is more negative than said desired output signal;

means, associated with each of said signal input lines, for generating a positive-input-present-signal if a positive input signal is present on said signal input line and for generating a negative-input-signal-present signal if a negative input signal is present on said signal input line;

means for defining a weight-update interval;

means, associated with each of said columns, responsive to the simultaneous presence of said positive error signal and said positive-input-present-signal and active during said weight-update interval, for activating said first means for injecting electrons onto said first floating nodes associated with each column at a rate proportional to the product of said positive error signal and said positive-input-present-signal associated with each column;

means, associated with each of said columns, responsive to the simultaneous presence of said positive error signal and said negative-input-present-signal and active during said weight-update interval, for activating said second means for injecting electrons onto said second floating nodes associated with each column at a rate proportional to the product of said positive error signal and said negative-input-present-signal associated with each column;

means responsive to the simultaneous presence of said negative error signal and said positive-input-present-signal and active during said weight-update interval, for activating said second means for injecting electrons onto said second floating nodes associated with each column at a rate proportional to the product of said negative error signal and said positive-input-present-signal associated with each column;

means responsive to the simultaneous presence of said negative error signal and said negative-input-present-signal and active during said weight-update interval, for activating said first means for injecting electrons onto said first floating nodes associated with each column at a rate proportional to the product of said negative error signal and said negative-input-present-signal associated with each column.

6. The synaptic array of claim 5 wherein said third means comprises tunneling devices.

* * * * *